United States Patent
Koseki et al.

(10) Patent No.: US 10,858,295 B2
(45) Date of Patent: Dec. 8, 2020

(54) COMPOSITE PARTICLES, COMPOSITE POWDER, METHOD FOR MANUFACTURING COMPOSITE PARTICLES, AND METHOD FOR MANUFACTURING COMPOSITE MEMBER

(71) Applicant: HITACHI METALS, LTD., Tokyo (JP)

(72) Inventors: Shuho Koseki, Yasugi (JP); Tadashi Furuya, Yasugi (JP); Daiki Shinno, Yasugi (JP); Kenichi Inoue, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 205 days.

(21) Appl. No.: 16/080,730

(22) PCT Filed: Feb. 23, 2017

(86) PCT No.: PCT/JP2017/006879
§ 371 (c)(1),
(2) Date: Aug. 29, 2018

(87) PCT Pub. No.: WO2017/150340
PCT Pub. Date: Sep. 8, 2017

(65) Prior Publication Data
US 2019/0016641 A1    Jan. 17, 2019

(30) Foreign Application Priority Data
Mar. 1, 2016 (JP) .................................. 2016-038818

(51) Int. Cl.
*C04B 35/628* (2006.01)
*B22F 3/16* (2006.01)
(Continued)

(52) U.S. Cl.
CPC ...... *C04B 35/62842* (2013.01); *B22F 1/0011* (2013.01); *B22F 1/0014* (2013.01);
(Continued)

(58) Field of Classification Search
CPC ... C04B 35/62842; B33Y 70/00; B33Y 80/00; B29C 64/153; B22F 1/0011;
(Continued)

(56) References Cited

U.S. PATENT DOCUMENTS

2014/0271321 A1    9/2014    Maderud et al.
2015/0147572 A1    5/2015    Sato et al.
(Continued)

FOREIGN PATENT DOCUMENTS

CN    105132779 A    12/2015
EP    3 395 781 A1    10/2018
(Continued)

OTHER PUBLICATIONS

International Search Report for PCT/JP2017/006879 dated May 30, 2017 [PCT/ISA/210].
(Continued)

Primary Examiner — Anthony J Zimmer
Assistant Examiner — Ricardo D Morales
(74) Attorney, Agent, or Firm — Sughrue Mion, PLLC

(57) ABSTRACT

The present invention pertains to high-strength/high-ductility alloys, and in particular, provides high-strength composite particles comprising a ceramic phase and a metal phase, a composite powder, a method for manufacturing composite particles, and a method for manufacturing a composite member. Composite particles including a ceramic phase and a metal phase, wherein the composite particles are characterized in that the porosity is no greater than 45% in area ratio in cross-section, and the area ratio of the metal phase, where the total area of the ceramic phase and the metal phase
(Continued)

is 100%, is at least 20%. A composite powder characterized in including a plurality of the composite particles.

7 Claims, 4 Drawing Sheets

(51) Int. Cl.

| | | |
|---|---|---|
| *B33Y 70/00* | (2020.01) | |
| *C22C 1/05* | (2006.01) | |
| *B33Y 80/00* | (2015.01) | |
| *B22F 1/00* | (2006.01) | |
| *C22C 29/02* | (2006.01) | |
| *B22F 3/105* | (2006.01) | |
| *B29C 64/153* | (2017.01) | |
| *B22F 1/02* | (2006.01) | |
| *C22C 29/08* | (2006.01) | |
| *C04B 35/56* | (2006.01) | |

(52) U.S. Cl.
CPC ............ *B22F 1/0096* (2013.01); *B22F 1/025* (2013.01); *B22F 3/1055* (2013.01); *B22F 3/16* (2013.01); *B29C 64/153* (2017.08); *B33Y 70/00* (2014.12); *B33Y 80/00* (2014.12); *C22C 1/05* (2013.01); *C22C 29/02* (2013.01); *B22F 1/02* (2013.01); *C04B 35/5626* (2013.01); *C04B 2235/3847* (2013.01); *C04B 2235/5436* (2013.01); *C22C 29/08* (2013.01)

(58) Field of Classification Search
CPC ...... B22F 1/0014; B22F 1/0096; B22F 1/025; B22F 3/1055; B22F 3/16; C22C 1/05; C22C 29/02
See application file for complete search history.

(56) References Cited

U.S. PATENT DOCUMENTS

| | | |
|---|---|---|
| 2017/0072469 A1 | 3/2017 | Maderud et al. |
| 2018/0209019 A1 | 7/2018 | Zhang et al. |
| 2019/0001556 A1* | 1/2019 | Ibe .................... B22F 3/105 |

FOREIGN PATENT DOCUMENTS

| | | |
|---|---|---|
| JP | 2007-262475 A | 10/2007 |
| JP | 2012-097287 A | 5/2012 |
| WO | 2013/176058 A1 | 11/2013 |
| WO | 2015/073081 A1 | 5/2015 |
| WO | 2015/162206 A2 | 10/2015 |

OTHER PUBLICATIONS

Communication dated Aug. 27, 2019, from the European Patent Office in counterpart European Application No. 17759806.7.
Zhigang Fang, et al., "A Dual Composite of WC-Co", Metallurgical and Materials Transactions A, Springer-Verlag, New York, Dec. 1, 1999, vol. 30A, No. 12, pp. 3231-3238 (8 pages total).
Communication dated Sep. 17, 2019, from Japan Patent Office in counterpart Japanese Patent Application No. 2018-503089.

* cited by examiner

10μm

1 μm

COMPOSITE PARTICLES, COMPOSITE POWDER, METHOD FOR MANUFACTURING COMPOSITE PARTICLES, AND METHOD FOR MANUFACTURING COMPOSITE MEMBER

CROSS REFERENCE TO RELATED APPLICATIONS

This application is a National Stage of International Application No. PCT/JP2017/006879 filed Feb. 23, 2017, claiming priority based on Japanese Patent Application No. 2016-038818 filed Mar. 1, 2016.

TECHNICAL FIELD

The present invention relates to a composite particle, a composite powder, and a method for manufacturing the composite particle. In particular, it relates to a high-strength composite particle suitable for three-dimensional additive manufacturing, a composite powder, a method for manufacturing the composite particle, and a method for manufacturing a composite member.

BACKGROUND ART

A composite powder composed of ceramic particles and metal particles, typically cemented carbides alloy or the like, has been used for various purposes, for example members for forming sintered body or thermal spraying. WO 2013/176058 A1 discloses cermet particles that can be used not only for thermal spraying but also for materials for forming sintered body or polishing grains. The cermet particles do not show a rupture point in a stress-strain curve when at least a part of composite particles receives a compressive load increasing up to 10 mN or more at a loading rate of 15.0 mN/s.

JP 2007-262475 A discloses a cemented carbide alloy powder. The number of Co powder of not smaller than 100 nm is controlled to be in a ratio of not more than 4% in a total number of powdered Co in order to uniformly distributing Co in the powder in order to improve mechanical strength.

CITATION LISTS

WO 2013/176058 A1
JP 2007-262475 A

SUMMARY OF INVENTION

Composite particles composed of ceramic particles and metal particles are excellent in high-temperature strength and therefore are suitable as a material for a warm/hot forging mold. As a manufacturing process for the mold, a sintering process has been known as widely used for cemented carbide alloy for cutting tools. However, thermal deformation is likely to occur during the sintering, and the number of steps involved in cutting of the mold in a subsequent process becomes enormous. Accordingly, they are considered unsuitable.

Attention is paid to an additive manufacturing method capable of locally melting and solidifying a metal powder or the like with a laser or the like to mold a structure into a desired shape without causing large deformation of the mold. Composite particles used for the additive manufacturing are required to have high strength so as to prevent clogging in a supply nozzle due to deformation of the particles and to prevent the powder from being destroyed during the additive manufacturing.

An object of the present invention is to provide a high-strength composite particle, a composite powder suitable for additive manufacturing etc., a method for manufacturing the composite particle, and a method for manufacturing a composite member with use of the composite powder.

In an embodiment of the present invention, provided is composite particle including a ceramic phase and a metal phase, wherein a porosity is not more than 45% by area ration in a cross section of the composite particle, and wherein an area ratio of the metal phase is not less than 20% in relation to a total area of the ceramic phase and the metal phase.

Preferably, an area ratio the ceramic phase in relation to a total area of the ceramic phase and the metal phase in a cross section of a region within 0.03*d from a surface of the particle, where "d" is a diameter of an approximate circle of a composite particle, is greater than an area ratio of the ceramic phase in relation to a total area of the ceramic phase and the metal phase over an entire cross sectional area of the composite particles.

In another embodiment of the present invention, provided is a composite powder including a plurality of the above composite particles.

Preferably, D50 of the powder is 30 to 150 μm in a volume cumulative particle size distribution of the powder.

In a further embodiment, provided is a method for manufacturing a composite particle including a ceramic phase and a metal phase. The method includes:
wet-mixing a ceramic powder and a metal powder at a volume ratio of 7:3 to 2:8 to produce a mixed powder;
dry-granulating the mixed powder to produce granulated particles, and
heating the granulated particles at a temperature T to produce the composite particle, wherein the temperature T is in a following range:

$$0.72*T_s \leq T < T_s \quad (1)$$

where $T_s$ is a solidus temperature in °C. of the metal powder.

Preferably, the ceramic powder has an average particle size of 0.1 to 20 μm.

In a further embodiment of the present invention, provided is a method for manufacturing a composite member with use of an additive manufacturing method, wherein the additive manufacturing method comprises melting the above composite powder and solidifying the melt.

According to the present invention, it is possible to produce high-strength composite particle or a composite powder, suitable for e.g. additive manufacturing, and to produce a composite member composed of an additive-manufactured product having excellent surface accuracy with use of the composite powder.

DESCRIPTION OF EMBODIMENTS

Hereinafter, the present invention is detailed described. However, the present invention is not limited to embodiments explained herein, but it will be understood that they can be modified or combined as far as it is within the spirit of the invention.

(Composite Particle)

In general, it is considered that ceramics has high strength but has low toughness and ductility, while metal has higher toughness and ductility but has lower strength than those of ceramics.

A composite particle composed of both of a ceramic phase and a metal phase according to the present invention includes a mixture of a hard ceramic phase as a main structure and a metal phase as a binder (binding phase). The composite particle is advantageous since it include both of the effect of the ceramic phase (high strength) and the effect of the metal phase (high ductility and toughness).

Ceramics in the ceramic phase of the composite particle according to the present invention is preferably selected from at least one of carbide, nitride, carbonitride, oxide and boride of W (tungsten), Cr (chromium), Mo (molybdenum), V (vanadium), Zr (zirconium), Al (aluminum), Si (silicon), Nb (niobium), Ta (tantalum) and Ti (titanium).

In addition, a material of the metal phase of the composite particle according to the present invention is preferably selected from at least one of Co (cobalt), Ni (nickel), Fe (iron), W (tungsten) and Mo (molybdenum).

In the following embodiments, tungsten carbide (WC)—Co composite particle including WC as the ceramic phase and Co as the metal phase is exemplary explained, unless otherwise specified.

Figure 1:
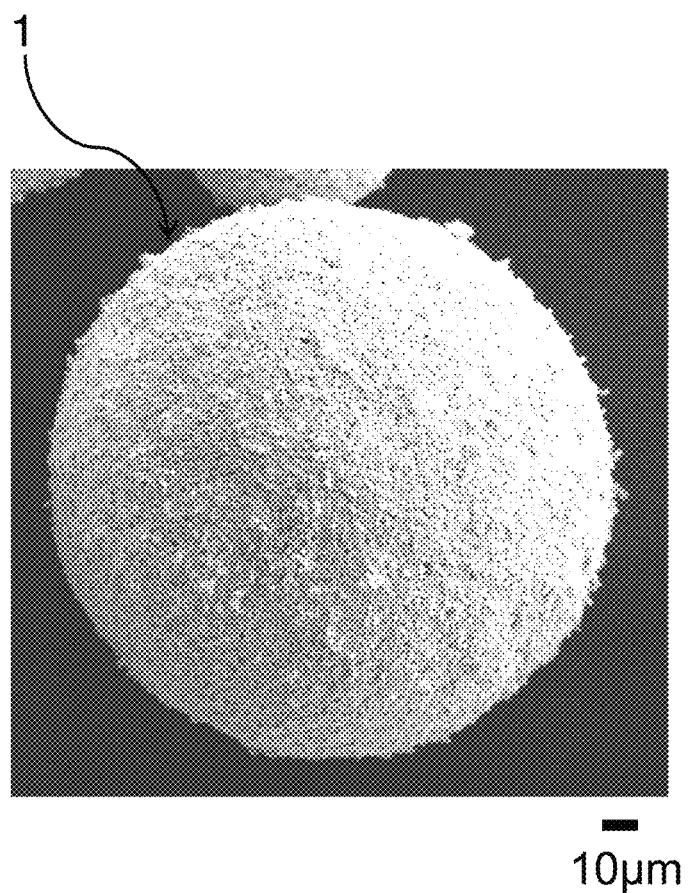
FIG. 1 is a scanning electron microscopic (SEM) photograph showing an example of a composite particle according to the present invention.
Figure 2:
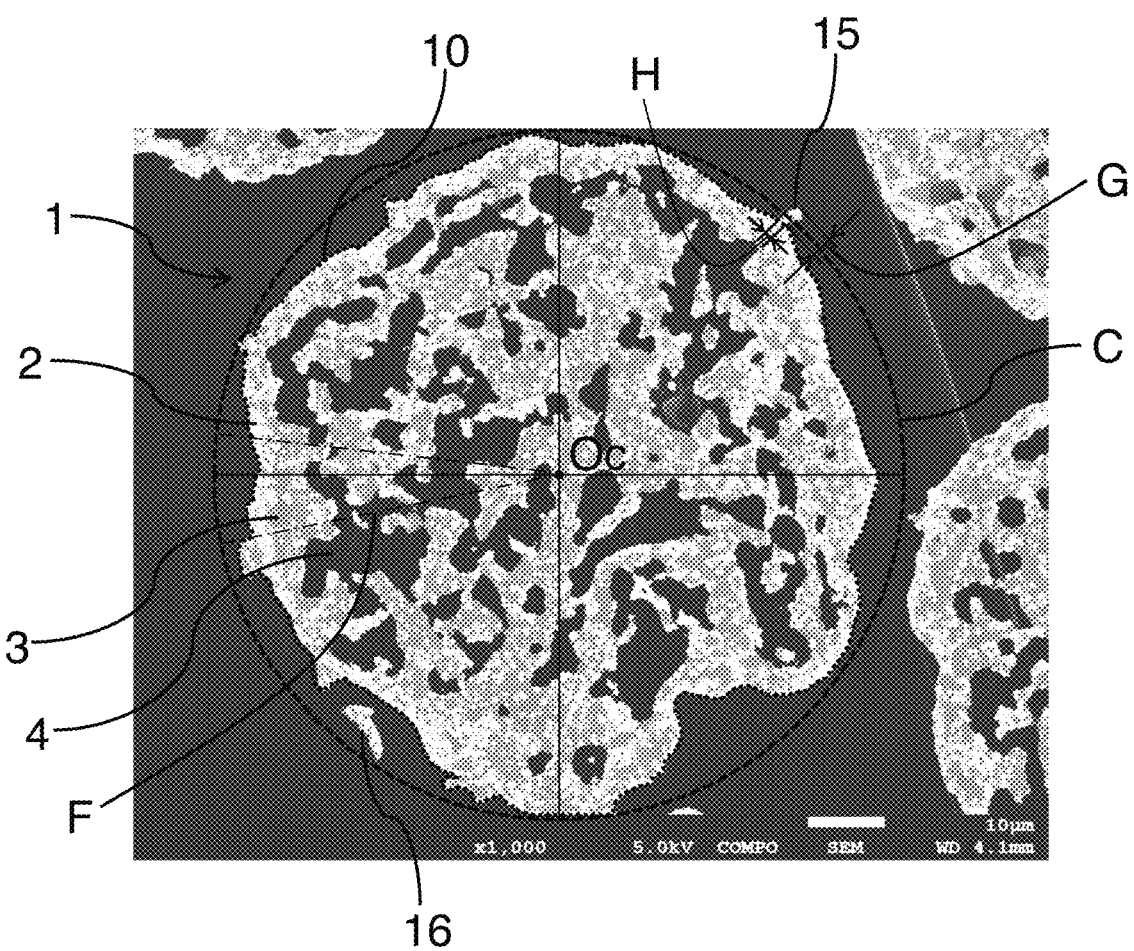
FIG. 2 is a scanning electron microscopic (SEM) photograph showing a cross section of a composite particle according to the present invention.

FIG. 1 shows a photograph of the composite particle of the present invention, and FIG. 2 shows a cross-sectional photograph of the composite particle of the present invention. In the composite particle of the present invention, an area ratio of the metal phase in the cross section of the particle is not less than 20% in relation to a total area of the ceramic phase and the metal phase, i.e. the total area of the ceramic phase and the metal phase is taken as 100%. This feature can improve toughness of the composite particles. This makes it possible, in case of manufacturing an additive-manufactured product from the composite particle of the present invention, to provide a high-strength additive-manufactured product, because a stable additive manufacturing can be performed since destruction of the composite particles during the additive manufacturing is suppressed. A preferable area ratio of the metal phase is not less than 25%, more preferably not less than 30%, further more preferably not less than 40%. In addition, the area ratio of the metal phase is preferably not more than 80%, more preferably not more than 65%. When the area ratio of the metal phase is less than 20%, properties of the ceramic phase becomes dominant. Then, the particle tends to be easily broken during the additive manufacturing, and a molded product manufactured by the additive manufacturing has too small toughness to use as a strength member. When the area ratio of the metal phase exceeds 80%, properties of the metal phase become dominant. Thus, the particle tends to be easily deformed during the additive manufacturing, and strength of the molded product manufactured by the additive manufacturing becomes too small to be used as a strength member.

Here, a "cross section of the particle" used herein refers to a cross section (substantially central cross section) passing through a vicinity of a center of the particle. The term "center" refers to a geometric center or a center of gravity of the particle.

Here, an example of a method for measuring the "substantially central cross section" is explained. First, a plurality of composite particles to be observed is embedded in a resin, followed by polishing with a polishing device. In the polished surface, cross sections of the particles are observed with a scanning electron microscope (SEM). Then, cross sections having a diameter falling within ±10% different from a diameter corresponding to D50 in a volume cumulative particle size distribution which have been previously obtained by a laser diffraction method or the like are defined as the "substantially central cross section" of the composite particle. FIG. 2 is a cross section of the composite particle of the present invention taken by the above measuring method. Note that, in case of evaluation using one composite particle, an outer diameter of the one composite particle is measured (for example, measured by a scanning electron microscopic (SEM) photograph as shown in FIG. 1). Then, a cross section having a diameter falling within ±10% different from the outer diameter is defined as the "substantially central cross section" of the composite particle.

Furthermore, the composite particle of the present invention includes pores and porosity in the cross section of the particle is not more than 45% by area ratio. This feature can provide high-strength particles which are hardly deformed and can suppress destruction of particles during the additive manufacturing. In order to obtain higher-strength composite particle, the porosity is preferably made not more than 40%, more preferably not more than 35%. When the porosity exceeds 45%, deformation or rupture due to the decrease in strength tends to occur. Here, the porosity is an area ratio occupied by pores 4 when the cross-sectional area of the composite particle is set to 100% in FIG. 2, and the cross-sectional area of the composite particle is an inner area of a particle surface (uneven surface) 10 represented by a dotted line in FIG. 2. For calculation of the cross-sectional area, a projection portion 15 and an island portion 16 are not included. In addition, a space between the island portion 16 and the particle surface 10 is not included in the pore 4. Herein, the term "projection portion" is defined as a portion having a value of a ratio G/H of a height G to a base width H of the projection portion being not less than 1.5.

Figure 3:
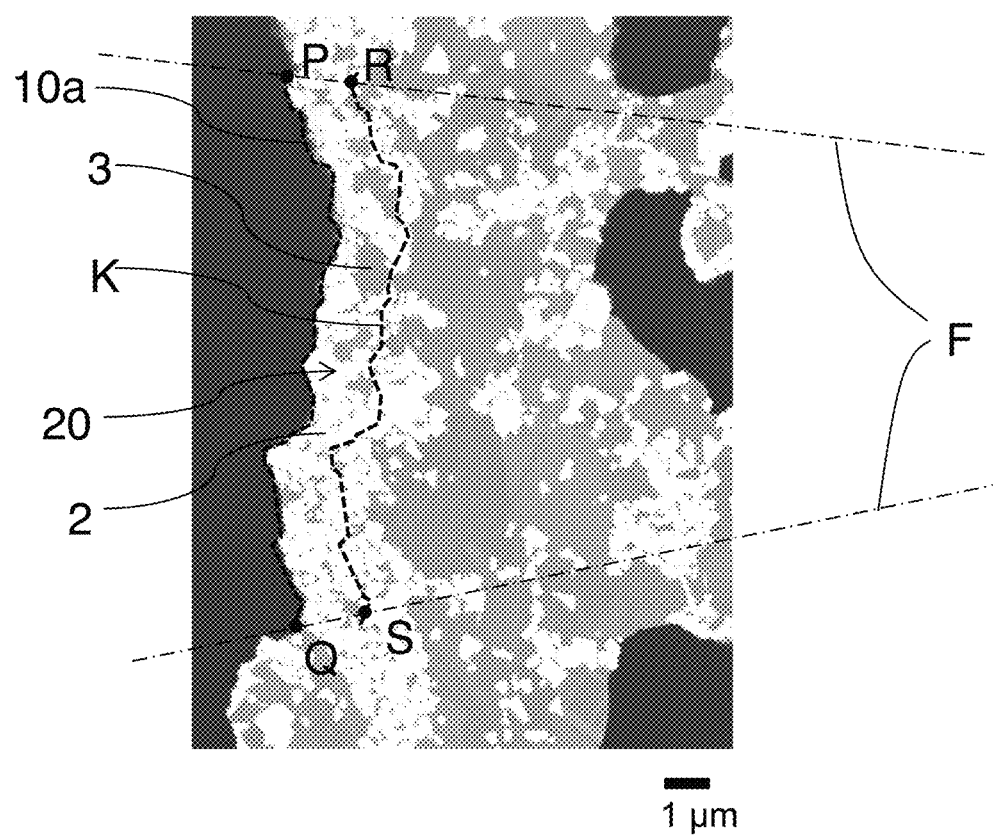
FIG. 3 is a scanning electron microscopic (SEM) photograph showing an enlarged main part of FIG. 2 for illustrating a ceramic thickened layer.

In the composite particle of the present invention, when a total area of the ceramic phase and the metal phase in the cross section of the particle is taken as 100%, an area ratio of the ceramic phase in an region within 0.03*d from a surface toward a center of the particle is preferably greater than an area ratio of the ceramic phase in the entire cross section of the composite particle. Here, "d" indicates a diameter of an approximate circle C (an accurate circle having a smallest diameter as far as the particle is contained in the circle) in the cross-sectional view of the composite particle. More preferably, the area ratio of the ceramic phase in the region within 0.05*d from the surface toward the center of the particle is greater than the area ratio of the ceramic phase in the entire cross section of the composite particle. Here, a layer in which the area ratio of the ceramic phase in the region within 0.03*d (or 0.05*d) from the surface toward the center of the particle is greater than the area ratio of the ceramic phase in the entire cross section of the composite particle (hereinafter referred to as a ceramic thickened layer) more preferably has an area ratio of the ceramic phase of not less than 60%, further more preferably not less than 70%. The area ratio of the ceramic phase in the ceramic thickened layer is preferably not more than 95%, more preferably not more than 92%. The above features can further enhance the strength in the vicinity of the surface of the composite particles. This makes it possible to suppress deformation during the additive manufacturing when an additive-manufactured product is manufactured using the composite particles of the present invention, and thus to improve the fluidity in an injection nozzle. If the ceramic thickened layer is formed within less than 0.03*d, it is difficult to obtain the strength-increasing effect in the vicinity of the surface. Accordingly, in order to obtain the strength-increasing effect in the vicinity of the surface, it is particularly preferable that the ceramic thickened layer have an area ratio of the ceramic phase of not less than 60%, and the region of the ceramic thickened layer is formed in 0.03*d or more. Here, a description is made of an example of a method for measuring the ceramic thickened layer in the region of 0.03*d from the surface toward the center. As shown in FIGS. 2 and 3, a sector F having an arc length of 5% of a circumferential length of an approximate circle is drawn, while the sector has a center point at a center Oc of the approximate circle. Intersection points between respective two sides of the sector F and the composite particle surface 10 are denoted as P and Q, and intersection points between the respective two sides of the sector F and a virtual boundary line K are denoted as R and S, where the virtual boundary line K is drawn between P and Q of the approximate circle. The virtual boundary line K is drawn at a distance 0.03*d from a surface line 10a of the particle toward the center Oc and has a similar profile as the surface line 10a. For example, the virtual boundary line K may be drawn by parallel moving the surface line 10a. This parallel movement may be accomplished by moving a substantially middle point of the outline 10a by a distance of 0.03*d toward the center Oc. When the ceramic thickened layer is in a region of 0.05*d from a surface of the composite particle, the virtual boundary line K is drawn at a distance 0.05*d from the surface line 10a of the particle between P and Q toward the center Oc of the approximate circle.

Then, a ratio of the ceramic phase is measured in a region surrounded by PQRS, while an area of the composite alloy phase including the ceramic phase 2 and the metal phase 3 excluding the pores 4 is set 100%. The measurements are performed at four sectors while avoiding overlap of the measured region in a same composite particle. An average area ratio of the ceramic phase is calculated and is set as an area ratio of the ceramic phase in the region of 0.03*d.

Preferably, the area ratio of the ceramic phase in the region of 0.03*d from the surface toward the center of the particle has 1.2 times or more, more preferably 1.3 times or more, still more preferably 1.4 times or more higher than an area ratio in a region of 0.1*d from the surface toward the center of the particle. Furthermore, the area ratio of the ceramic phase in the region of 0.05*d from the surface toward the center of the particle has 1.15 times or more, more preferably 1.25 times or more, still more preferably 1.35 times or more higher than the area ratio in the region of 0.1*d from the surface toward the center of the particle. The features can provide the composite particles having a higher-strength ceramic thickened layer. Note that a method for measuring the area ratio of the ceramic phase here is achieved by performing measurement in the same manner as the method for measuring the ceramic thickened layer as described above.

The composite particle of the present invention preferably has a compressive strength of, for example, not less than 20 MPa. The more preferable compressive strength is not less than 50 MPa. When the compressive strength not less than 20 MPa, deformation and breakage of the composite particle can be more effectively suppressed during the additive manufacturing.

It is preferable that the ceramic particles constituting the ceramic phase in the cross section of the composite particle of the present invention have a polygonal shape having a circularity of not less than 0.6. The more preferable circularity is not less than 0.7. The above feature can further improve the strength of the composite particles of the present invention.

(Composite Powder)

The composite powder of the present invention includes a plurality of the composite particles of the present invention. Specifically, when the whole composite powder includes the composite particles of the present invention in an amount of not less than 40% by volume, advantageous effects can be exhibited during the additive manufacturing, for example. Other than the composite particles of the present invention, the composite powder of the present invention may include a carbon powder or metal powder having similar particle size to that of the composite powder.

The composite powder of the present invention preferably has a diameter "d" of D50 in the volume cumulative particle size distribution being 30 to 150 μm. When "d" is less than 30 μm, the additive manufacturing rate decreases, for example, so that the efficiency of the additive manufacturing decreases. When "d" is greater than 150 μm, a surface accuracy of an additive-manufactured product tends to decrease, for example.

(Method for Manufacturing Composite Particle)

The present invention provides a method for manufacturing composite particle including a ceramic phase and a metal phase, including:

wet-mixing a ceramic powder and a metal powder at a volume ratio of 7:3 to 2:8 to produce a mixed powder;

dry-granulating the mixed powder to produce granulated particles, and heating the granulated particles at a temperature T to produce the composite particle, wherein the temperature T is in a following range:

$$0.72*Ts \leq T < Ts \quad (1)$$

where Ts is a solidus temperature in ° C. of the metal powder.

The above manufacturing method makes it possible to provide the composite particle having few pores and high-strength. Hereinafter, the steps of the method are explained.

<Producing Mixed Powder>

In this step, the ceramic powder and the metal powder are wet mixed together with a liquid such as ethanol or water in a mixer such as an attritor or a ball mill to produce a slurry mixed powder. At the time of mixing, a volume ratio of the ceramic powder to the metal powder is adjusted in a range of 7:3 to 2:8. When the volume ratio is out of the range, it is difficult to produce a high-strength powder.

In the step, less than 5 parts by mass of wax such as paraffin is added with respect to total 100 parts by mass of the ceramic powder and the metal powder in order to produce uniform composite particles. When the amount of wax to be added is not less than 5 parts by mass, increased number of pores are generated in the composite particle during a heat treatment as described later, leading to possible reduce in the particle strength. When the amount of wax to be added is too small, it is difficult to produce a granulated composite powder at the time of dry granulation as described later. Accordingly, the amount of wax to be added is preferably not less than 0.1 parts by mass with respect to the total mass ratio of the ceramic powder and the metal powder.

An average particle size of the ceramic powder used in the manufacturing method of the present invention is preferably 0.1 to 20 μm, more preferably 0.1 to 10 μm. The ceramic powder having the above particle size allows the ceramic thickened layer to be easily formed on a surface of the composite powder, thereby improving the strength of the powder. Furthermore, an average particle size of the metal powder is preferably, for example, 0.1 to 5 μm. The average particle size of the powder can be measured by, for example, a laser diffraction method. In the embodiment, the average particle size is defined as a particle diameter (Fischer diameter) measured using a Fischer Sub-Sieve Sizer as described in JIS-H-2116 (2002).

<Producing Granulated Particles by Dry Granulation>

In the step of dry granulation to produce the granulated mixed powder, a spray dryer or the like may be used. The spray dryer makes it possible to produce more uniform granulated particle having a shape approximate to a sphere. After dry granulation by the spray drier, it is preferable to perform sizing with use of a sieve or air flow classification.

<Degreasing/Heating>

The wax added in the mixing step becomes unnecessary in the subsequent steps. Thus, the granulated particle is degreased at a temperature of not lower than 200° C. for a predetermined time period to remove the wax, after the spray dryer. Furthermore, the degreased granulated particle is heated at a temperature T in a range of $0.72*Ts \leq T < Ts$ (Ts: solidus temperature of the metal powder) to produce the composite particle. The heat treatment at the temperature can facilitate solid phase diffusion of the metal phase, thereby producing dense and high-strength composite particle. When the temperature of the heat treatment exceeds Ts, the particles are bonded to each other or it is difficult to maintenance the granular shape. When the temperature is less than 0.72*Ts, a porosity of the composite particle becomes larger, leading to decrease in strength. Note that when the metal powder is made of one kind of metal, the solidus temperature of metal powder indicates a melting point of the metal. However, when two or more kinds of metal powder are used, it indicates a solidus temperature of an alloy of the metals. In case of WC—Co composite particle (solidus temperature (Ts) of cobalt is about 1495° C.), a lower limit of the heating temperature is 1076° C., more preferably 1100° C. Preferable upper limit of heating temperature is 1350° C. In case of using TiCN—Ni composite particle for which TiCN is selected as the ceramic powder and Ni is as the metal powder (solidus temperature (Ts) nickel is about 1455° C.), preferable lower limit of the heating temperature is 1047° C. The particle can be heated at a higher temperature than that for the WC—Co composite particle, since TiCN powders are hard to be sintered. While atmosphere during the heat treatment is not particularly limited, the heat treatment is preferably carried out under a reduced pressure in a non-oxidizing atmosphere such as argon or nitrogen.

An additive manufacturing method repeats deposition of a powder, melting and solidification of the powder. The composite powder of the present invention may be applied to the additive manufacturing method to produce a composite member having few cracks and excellent surface accuracy. An existing additive manufacturing device can be used. For example, a laser is used as a heat source for melting the powder in the embodiment. However, it is not always necessary to use the laser, but similar additive manufacturing is suitably enabled even using an electron beam, arc or plasma. The powder of the present invention can also be applied to a powder bed method in which a previously spread powder is irradiation heated, a direct metal deposition method in which a powder is directly sprayed on a heat source to be welded to a substrate, or the like.

EXAMPLES

Hereinafter, the present invention is explained more detail with reference to Examples and Comparative Examples. Note that the present invention is not limited to these Examples.

Example 1

First, a tungsten carbide powder (average particle size of 0.8 μm) and a cobalt powder (average particle size of 0.6 μm) were used as a raw material powder, and were weighed such that a volume ratio of the tungsten carbide powder to the cobalt powder was 6:4. Then, a small amount of carbon powder and paraffin wax were added to the weighed powder. The mixture was placed into an attritor together with ethanol, followed by wet mixing to produce a slurry of the mixed powder. Then, the produced slurry of the mixed powder was dry granulated by a spray dryer to produce a granulated powder. As sample No. 1 of Example of the present invention, the granulated powder was degreased and then heated at 1260° C. to produce a plurality of composite particles (composite powder). As sample No. 11 of Comparative Example, the granulated powder was degreased and then heated at 1050° C. to produce a plurality of composite particles (composite powder). As other Comparative Examples, the tungsten carbide powder and the cobalt powder were weighed to a volume ratio of 9:1. A granulated powder was manufactured through the same process as for No. 1, and the granulated powder was degreased and then heated at 1050° C. to produce a plurality of composite particles (composite powder) as No. 12. The granulated powder was degreased and then heated at 1300° C. to produce a plurality of composite particles (composite powder) as No. 13. An average particle size of the raw material powder is an average particle diameter measured by a Fischer Sub-Sieve Sizer.

Figure 4:
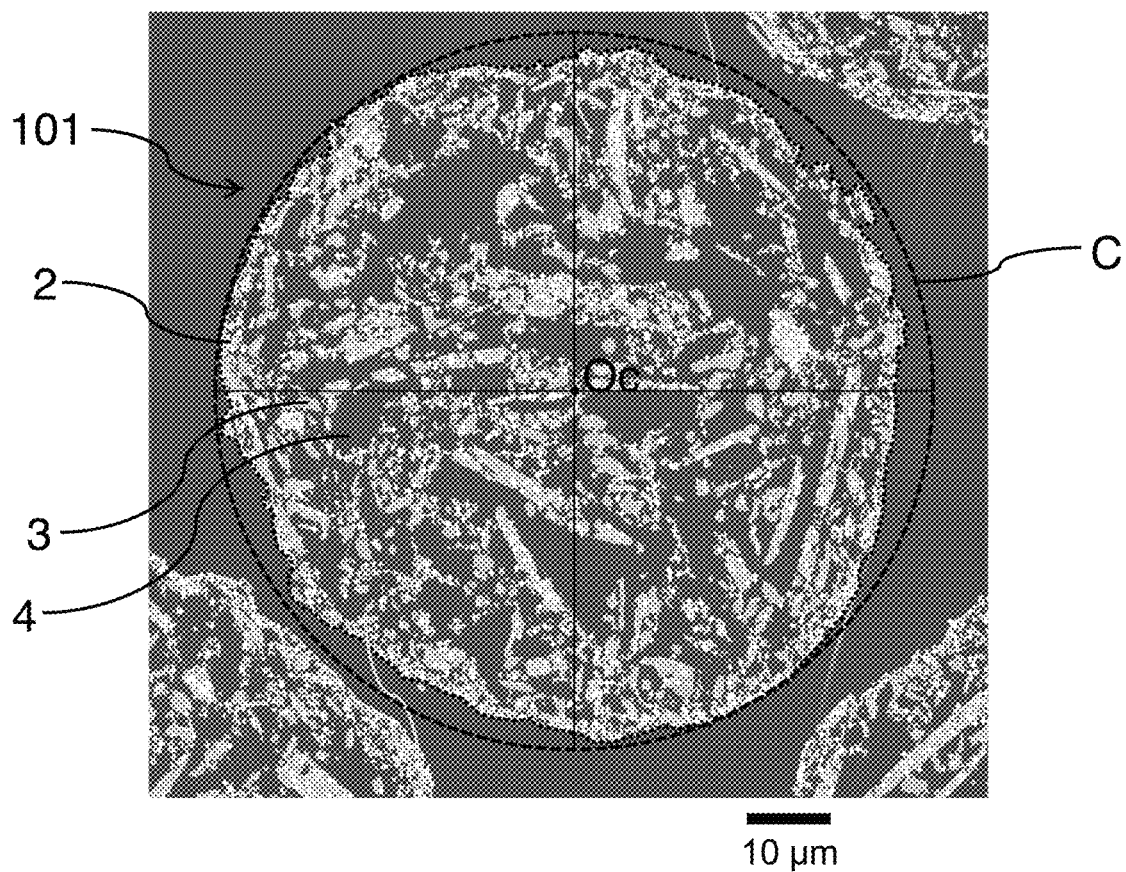
FIG. 4 is a scanning electron microscopic (SEM) photograph showing a cross section of a composite particle of a comparative example.

For measurement of D50 in the volume cumulative particle size distribution, a laser diffraction/scattering type particle size distribution measuring device "Microtrac MT 3000 II" manufactured by MicrotracBEL Corp. was used. In order to observe a cross section of the composite particle, composite particles were vacuum impregnated with a two-liquid-type room temperature curing epoxy resin. After solidification, the composite particles were subjected, together with the resin, to an ion milling by a Cross Section Polisher manufactured by JEOL Ltd., and then the cross section of the composite particle having a diameter falling within ±10% different from a diameter corresponding to D50 in the volume cumulative particle size distribution was observed by a field emission type scanning electron microscope manufactured by JEOL Ltd. A cross-sectional photograph of No. 1 is shown in FIG. 2, and that of No. 11 is shown in FIG. 4. An area ratio of the ceramic phase, an area ratio of the metal phase, and porosity were calculated using an image analysis software "Scandium Ver. 5.2" manufactured by Seika Corporation. In addition, a compressive strength of a produced particle was measured with a micro compression tester "MCT-510" manufactured by Shimadzu Corporation. The measurement results are shown in Table 1. In the composite particle of No. 1, an area ratio of the ceramic phase to the entire cross section is 47%, and an area ratio of the ceramic phase in the ceramic thickened layer is 72%, which ceramic thickened layer is in a region of 0.03*d from the particle surface. Similarly, an area ratio of the ceramic phase in the ceramic thickened layer in a region of 0.05*d from the particle surface is 70%, and an area ratio of the ceramic phase in a region of 0.1*d from the particle surface is 51%. In the composite particle of No. 11, an area ratio of the ceramic phase to the entire cross section is 36%, an area ratio of the ceramic phase in a region of 0.03*d from the particle surface is 53%, an area ratio of the ceramic phase in a region of 0.05*d from the particle surface is 51%, and an area ratio of the ceramic phase in the ceramic phase in a region of 0.1*d from the particle surface is 45%.

to the nickel powder was 5:5. Then, a small amount of carbon powder and paraffin wax were added to the weighed powder. The mixture was placed into an attritor together with ethanol, followed by wet mixing to produce a slurry of the mixed powder. Then, the produced slurry of the mixed powder was dry granulated by a spray dryer to produce a granulated powder, and the produced granulated powder was degreased and then heated at 1300° C. to produce a plurality of composite particle No. 2 of Example of the present invention. Furthermore, the titanium carbonitride powder and the nickel powder were weighed at a volume ratio of 9:1. A granulated powder was manufactured through the same process as for No. 2, and subsequently the granulated powder was degreased and then heated at 1450° C. to produce a plurality of composite particle No. 14 of Com-

TABLE 1

| SAMPLE No. | VOLUME RATIO OF CERAMIC POWDER (WC) TO METAL POWDER (Co) | HEAT TREATMENT TEMPERATURE (° C.) | D50 OF COMPOSITE POWDER (μm) | AREA RATIO OF METAL PHASE (TO ENTIRE CROSS SECTION OF COMPOSITE PARTICLE)(%) | PRESENCE OR ABSENCE OF CERAMIC THICKENED LAYER | POROSITY (%) | COMPRESSIVE STRENGTH (MPa) |
|---|---|---|---|---|---|---|---|
| No. 1 (EXAMPLE OF PRESENT INVENTION | (WC)6:(Co) | 1260 | 118 | 53 | PRESENT | 34 | 308 |
| No. 11 (COMPARATIVE EXAMPLE) | (WC)6:(Co)4 | 1050 | 125 | 64 | PRESENT | 64 | 2 |
| No. 12 (COMPARATIVE EXAMPLE) | (WC)9:(Co)1 | 1050 | 124 | 7 | ABSENT | 70 | 24 |
| No. 13 (COMPARATIVE EXAMPLE) | (WC)9:(Co)1 | 1300 | 114 | 8 | ABSENT | 48 | 464 |

As can be seen from the results in Table 1, the sample No. 1 having lower-porosity exhibits higher-compressive strength than those of the samples No. 11 and No. 12 each having higher-porosity. Accordingly, it is confirmed that the sample No. 1 is a high-strength powder. Subsequently, the prepared composite powders No. 1, No. 12 and No. 13 were placed into a laser clad type additive manufacturing device, and a products of 45 mm*15 mm*8 mm height were manufactured under conditions of a laser power of 1200 W, a modeling rate of 1.7 mm/min and a powder supply amount of 2 g/min. Then, the appearance of the molded products was observed. As a result, a product from No. 1 composite powder had no defective appearance or the like, and had excellent shape. On the contrary, since No. 12 composite powder has small compressive strength of 24 MPa, it crushed in the vicinity of the nozzle during the manufacturing, causing a nozzle clogging defect. Furthermore, No. 13 composite powder had high compression strength of powder of 464 MPa and additive manufacturing was enabled, but cracks occurred in the products. This is probably because the amount of metal phase of Co is small, and the property of ceramics is dominant and the toughness is lowered.

Example 2

A titanium carbonitride powder (average particle size of 1.2 μm) and a nickel powder (average particle size of 2.5 μm) were used as a raw material powder, and were weighed such that a volume ratio of the titanium carbonitride powder parative Example. An average particle size of the raw material powder is an average particle diameter measured by a Fischer Sub-Sieve Sizer.

For the obtained No. 2 and No. 14 samples, the volume cumulative particle size distribution D50 and compressive strength were measured with the same measuring device as Example 1. The results are shown in Table 2. As a result of preliminary measurement, the porosity of the sample No. 2 was not more than 45 area %, the area ratio of the metal phase was not less than 20%, the porosity of the composite powder No. 14 was not more than 45 area %, and the area ratio of the metal phase was less than 20%.

TABLE 2

| SAMPLE No. | VOLUME RATIO OF CERAMIC POWDER (TiCN) TO METAL POWDER (Ni) | HEAT TREATMENT TEMPERATURE (° C.) | D50 OF COMPOSITE POWDER (μm) | COMPRESSIVE STRENGTH (MPa) |
|---|---|---|---|---|
| No. 2 (EXAMPLE OF PRESENT INVENTION) | (TiCN)5:(Ni)5 | 1300 | 119 | 273 |
| No. 14 (COMPARATIVE EXAMPLE) | (TiCN)9:(Ni)1 | 1450 | 123 | 450 |

Although powders different from those in Example 1 are used, it is confirmed from the results in Table 2 that No. 2 and No. 14 samples also have high-compressive strength. Subsequently, the composite powders No. 2 and No. 14 were placed into a laser clad type additive manufacturing device, and a product of 45 mm*15 mm*8 mm height was manufactured under conditions of a laser power of 1200 W, a modeling rate of 1.7 mm/min and a powder supply amount of 2 g/min. Then, the appearance of the product was observed. As a result, the product from the No. 2 composite powder had no defective appearance or the like, and had excellent shape. On the other hand, No. 14 resulted in cracks in the product. It is probably because the amount metal phase of Ni is small, and the property of ceramics is dominant and the toughness is lowered. From the above results, it is expected that when the particles of Example of the present invention are applied to additive manufacturing, it is possible to efficiently manufacture an additive-manufactured product having excellent surface accuracy which suppresses clogging in a nozzle due to deformation and particle destruction during the additive manufacturing.

REFERENCE SIGNS LIST 1, 101: Composite particle
2: Ceramic phase
3: Metal phase
4: Pore
10: Composite particle surface
15: Projection portion
16: Island portion
20: Ceramic thickened layer
C: Approximate circle of composite particle
F: Sector
G: Length of projection portion
H: Width of projection portion
K: Virtual boundary line
Oc: Center of approximate circle

The invention claimed is:

1. A composite particle comprising a ceramic phase and a metal phase,
   wherein a porosity is not more than 45%, by area, in a cross section of the composite particle, and
   wherein an area ratio of the metal phase is not less than 20% in relation to a total area of the ceramic phase and the metal phase,
   wherein an area ratio of the ceramic phase in relation to a total area of the ceramic phase and the metal phase in a cross section of a region within 0.03*d from a surface of the particle, where "d" is a diameter of an approximate circle of a composite particle, is greater than an area ratio of the ceramic phase in relation to a total area of the ceramic phase and the metal phase over an entire cross sectional area of the composite particles, and
   wherein the area ratio of the ceramic phase in the region of 0.03*d from the surface toward the center of the particle is 1.2 times or more higher than an area ratio in a region of 0.1*d from the surface toward the center of the particle.

2. A composite powder comprising a plurality of the composite particles according to claim 1.

3. The composite powder according to claim 2, wherein D50 of the powder is 30 to 150 μm in a volume cumulative particle size distribution of the powder.

4. A method for manufacturing the composite particle according to claim 1 comprising:
   wet-mixing a ceramic powder and a metal powder at a volume ratio of 7:3 to 2:8 to produce a mixed powder;
   dry-granulating the mixed powder to produce granulated particles, and
   heating the granulated particles at a temperature T to produce the composite particle, wherein the heating is performed under a reduced pressure in a non-oxidizing atmosphere and the temperature T is in a following range:

$$0.72*Ts \leq T < Ts \quad (1)$$

where Ts is a solidus temperature in ° C. of the metal powder.

5. The method according to claim 4, wherein the ceramic powder has an average particle size of 0.1 to 20 μm.

6. A method for manufacturing a composite member through an additive manufacturing method, wherein the additive manufacturing method comprises melting the composite powder according to claim 2 and solidifying the melt.

7. The composite particle according to claim 1, wherein the area ratio of the metal phase is 30% to 80% in relation to the total area of the ceramic phase and the metal phase in the cross section of the composite particle.

* * * * *